(No Model.) 2 Sheets—Sheet 1.

F. KAHLER.
MACHINE FOR CUTTING NOODLES.

No. 559,713. Patented May 5, 1896.

Inventor
Ferdinand Kahler

Witnesses
E. H. Monroe
L. P. Nolhaupt

By his Attorneys
C. A. Snow & Co.

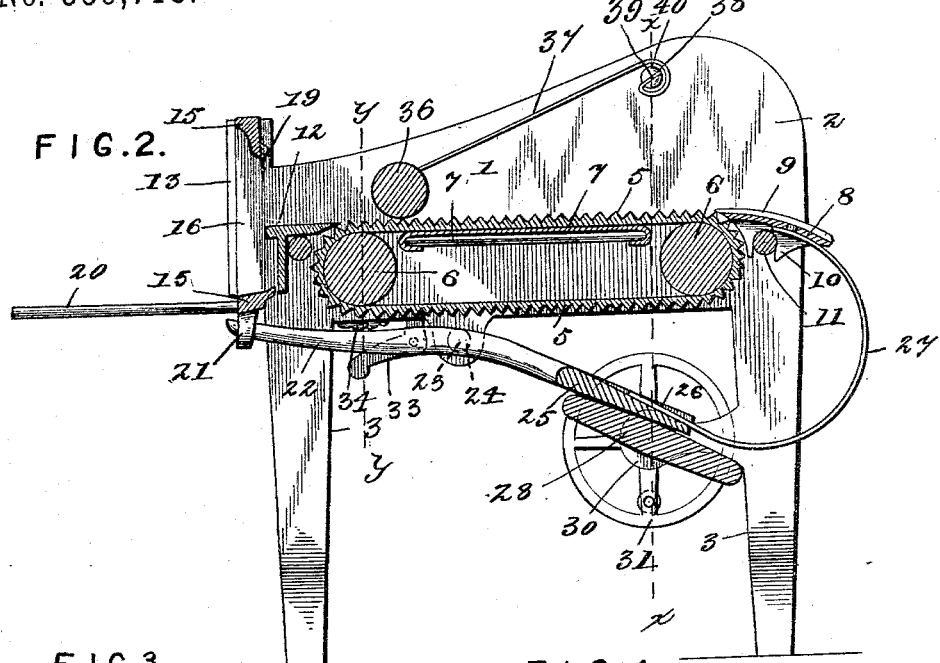

UNITED STATES PATENT OFFICE.

FERDINAND KAHLER, OF SILVER GROVE, INDIANA.

MACHINE FOR CUTTING NOODLES.

SPECIFICATION forming part of Letters Patent No. 559,713, dated May 5, 1896.

Application filed July 24, 1894. Renewed August 27, 1895. Serial No. 560,705. (No model.)

*To all whom it may concern:*

Be it known that I, FERDINAND KAHLER, a citizen of the United States, residing at Silver Grove, in the county of Floyd and State of Indiana, have invented a new and useful Improvement in Machines for Cutting Noodles, of which the following is a specification.

This invention relates to noodle-cutters; and it has for its object to provide a new and useful machine of this character having simple and efficient means for cutting noodles into the proper uniform sizes for soup, and for separating the same after being cut.

Figure 1:
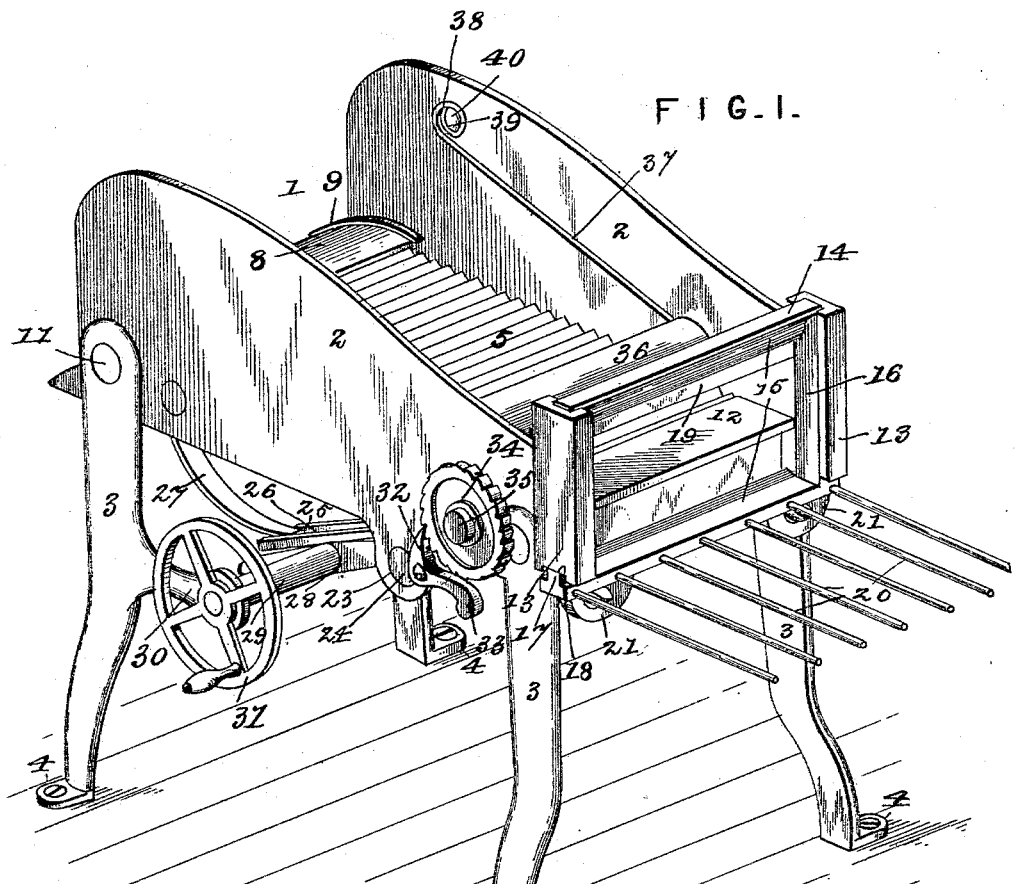
Figure 5:
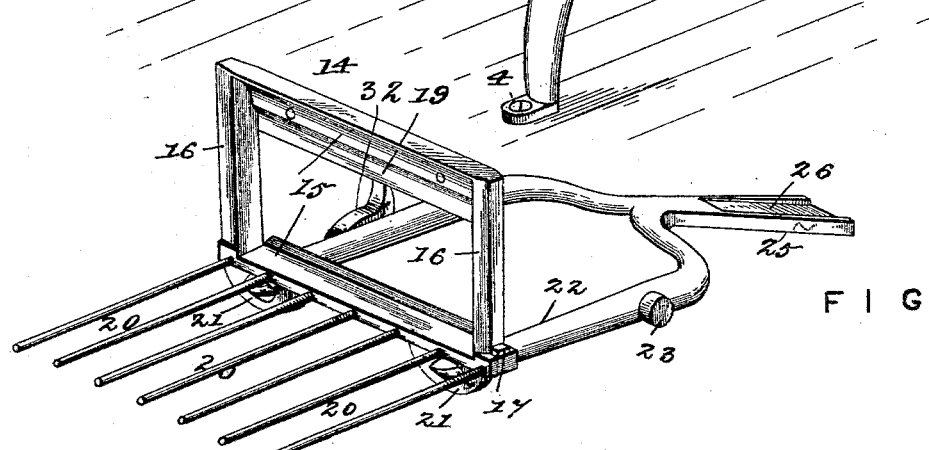

To this end the invention consists in the novel construction, combination, and arrangement of parts hereinafter more fully described, illustrated, and claimed In the accompanying drawings, Figure 1 is a perspective view of a noodle-cutter constructed in accordance with this invention. Fig. 2 is a central vertical longitudinal sectional view thereof. Fig. 3 is a vertical transverse sectional view on the line $x\ x$ of Fig. 2. Fig. 4 is a similar view on the line $y\ y$ of Fig. 2. Fig. 5 is a detail in perspective of the vertically-reciprocating rectangular knife-frame and the separating-fingers attached thereto.

Referring to the accompanying drawings, 1 designates a feed trough or hopper essentially comprising the opposite connected side pieces 2, and open at both ends, and said feed trough or hopper 1 is preferably supported on the supporting legs or standards 3, provided at their lower ends with the attaching flanges or feet 4, that are secured by means of screws or other suitable fasteners to a floor or other bed on which the machine is placed. The said feed trough or hopper 1 accommodates for movement therein the endless feed belt or apron 5, the opposite ends of which are arranged to pass over the belt-rollers 6, journaled between the opposite sides of the trough near the ends thereof. The endless feed belt or apron 5 preferably consists of a transversely-corrugated rubber belt, as illustrated in the drawings, such being found to be the best construction of belt for feeding the noodle-dough from the receiving end of the trough or hopper up to the cutter located at one end thereof, and the upper portion of said belt is arranged to work over the intermediate platform-board 7, arranged between the opposite sides of the trough and the oppositely-located rollers 6, over which the belt passes.

At the rear or receiving end of the endless feed-belt 5 is arranged the curved feed-table 8. The curved feed-table 8 is arranged transversely between the opposite sides of the trough at the rear end thereof, and is engaged at its opposite ends under the curved retaining-flanges 9, projected from the inner faces of the opposite sides of the trough at the rear end thereof, and at its opposite ends the said feed-table is provided with the notched lugs 10, projected from its under side and detachably engaging over the transverse tie-bolt 11, which connects the opposite sides of the trough at its rear end. By the means described the said table 8 is removably secured in position so as to have its inner edge overlap or closely meet the rear end of the endless feed-belt, so that the noodle-dough can be placed on the said table, properly arranged, and then fed onto the belt 5, which will carry the same up to the front rest-table 12, connecting the opposite sides of the trough at the front end thereof, and at opposite sides of the trough, directly in front of the front rest-table 12, are arranged the opposite upright guides 13, having inner grooved sides adapted to loosely receive therein the opposite ends of the vertically-reciprocating rectangular knife-frame 14. The said rectangular knife-frame 14 comprises the upper and lower side bars 15 and the opposite end bars 16, connecting said upper and lower side bars and working in the grooved guides 13, to form slides for the knife-frame, and near their lower ends the said end slide-bars 16 are provided with the stop-shoulders 17, which are adapted to engage in the lower notched ends 18 of the upright guides 13, so as to limit the upward movement of the knife-frame. The said open rectangular knife-frame 14 has attached to one side of its upper side bar the cutting or knife blade 19, which is horizontally arranged and is adapted to work directly in front of the front edge of the rest-table 12, in close proximity thereto, so that the noodle-dough which is fed onto the said table by the feed-belt 5 will be cut up into the noodles as the knife-frame moves up and down or reciprocates in front of the said rest-table. The lower side bar of said open rectangular knife-frame has fitted thereto the inner ends of a parallel series of forwardly-extending separating-fingers 20, which receive the cut noodles as they fall from the front rest-table 12 and serve to properly separate the same, and said lower side bar of the knife-frame from which said separating fingers or wires project is provided with the perforated lugs 21, which loosely receive the opposite extremities of a U-shaped lever-yoke 22.

The U-shaped lever-yoke 22 is provided at opposite sides with the journal-studs 23, loosely turning in the bearing-lugs 24 at opposite under sides of the trough 1, and the said U-shaped lever-yoke has extended from the closed end thereof the lever-arm 25, having an upper grooved side 26. The upper grooved side 26 of the lever-arm 25 receives the lower free end of the downwardly-pressing leaf-spring 27, the upper end of which is secured to the under side of the rear-end feed-table 8, and said spring serves to normally hold the lever-arm 25 against the double cams 28, arranged centrally on the operating-shaft 29. The operating-shaft 29 is journaled in suitable bearing-brackets 30, extended from one side of the rear supporting legs or standards, and carries upon one end a suitable operating-wheel 31, which is turned to operate the machine. At a point adjacent to one of the journal-studs 23 thereof the said lever-yoke 22 has pivotally attached thereto a catch-pawl 32, provided with a lower weighted arm 33, that normally holds the same into engagement with the ratchet-wheel 34, mounted on the extended spindle end 35 of one of said belt-rollers, and thereby providing means for communicating motion to the feed-belt simultaneously with the vertical reciprocations of the cutting-knife given thereto through the medium of the operating connections just described.

The noodle-dough carried by the feed-belt up to the front rest-table 12 is prevented from bunching onto the said rest-table and is caused to be evenly fed thereto by means of the yielding presser-roller 36. The presser-roller 36 is made of any suitable material and is arranged transversely within the feed-trough 1, so as to be disposed in close proximity to the front end of the feed-belt to secure the results stated, and the said yielding presser-roller 36 is journaled in the lower ends of the roller-supporting spring-arms 37, arranged within the feed-trough at opposite inner sides thereof. The said spring-arms 37 are arranged at an angle to properly dispose the roller 36, and are provided at their upper ends with the coils 38, which contribute to the spring or resiliency of said spring-arms, and at such upper ends the terminals of said spring-arms are fitted in the grooves 39 in the heads of the roller-supporting screws 40, secured in opposite inner sides of the feed-trough near the rear end thereof.

From the above it is thought that the construction, operation, and many advantages of the herein-described machine will be readily apparent without further description, and it will be understood that while the cutter is adapted especially for cutting noodles the same may be advantageously employed for other analogous uses, and changes in the form, proportion, and the minor details of construction may be resorted to without departing from the principle or sacrificing any of the advantages of this invention.

Having thus described the invention, what is claimed, and desired to be secured by Letters Patent, is—

1. In a noodle-cutter, the combination of a feed-trough, an endless feed belt or apron arranged to work within said feed-trough, a vertically-reciprocating knife-carrying frame supported to work at the front end of said trough, a series of forwardly-extending separating-fingers connected to the knife-frame, and a yielding presser-roller supported within the trough above said feed-belt, substantially as set forth.

2. In a noodle-cutter, the combination of an open feed-trough provided with end tables, an endless feed belt or apron arranged to work between said tables, a vertically-reciprocating knife-carrying frame supported to work in front of one of said tables and provided with forwardly-extending separating-fingers, and suitable operating means, substantially as set forth.

3. In a noodle-cutter, the combination of an open feed-trough provided at its rear end with inner curved retaining-flanges, a transverse tie-bolt connecting the opposite sides of the trough at the rear end, a curved feed-table having its opposite ends engaging under said flanges and provided with notched lugs engaging over said transverse tie-bolt, a front rest-table arranged at the front end of the trough, an endless feed-belt working between said tables, and a vertically-reciprocating cutter-knife supported to work in front of said rest-table, substantially as set forth.

4. In a noodle-cutter, the combination of an open feed-trough provided with end tables, a transversely-corrugated endless rubber feed-belt supported to travel between said end tables, a vertically-reciprocating rectangular knife-carrying frame supported to work in front of one of said end tables and having forwardly-extending separating-fingers, a presser-roller supported within the trough over the belt, and suitable operating means connected with said reciprocating knife-frame, and one of the rollers for said belt, substantially as set forth.

5. In a noodle-cutter, the combination of the feed-trough having opposite end tables, and opposite upright guides in front of one of said end tables, an open rectangular knife-frame sliding between said upright guides, a knife-blade attached to the upper side of said frame and working in front of the adjacent end tables, a series of forwardly-extending separating fingers or wires connected at their inner ends to the lower side of said knife-frame, and the endless feed-belt arranged to work between said end tables, substantially as set forth.

6. In a cutter, the combination of a feed-trough, the opposite belt-rollers journaled in said trough, a feed-belt working over said rollers, a vertically-reciprocating knife-carrying frame mounted at one end of the trough and provided at its lower side with perforated lugs, a U-shaped lever-yoke pivotally mounted under the trough and having its extremities loosely engaging in said perforated lugs, said lever-yoke being provided with an extended lever-arm, a spring arranged to bear on said lever-arm, a suitably-arranged operating-shaft carrying a double cam working under and against said lever-arm, a ratchet-wheel mounted on one spindle extremity of one of said belt-rollers, and a weighted catch-pawl pivoted to said lever-yoke and engaging said ratchet-wheel, substantially as set forth.

7. In a cutter, the combination of the feed-trough, the endless feed-belt, the cutter-frame arranged at one end of said trough and carrying a series of separating-fingers, opposite supporting-screws fitted to opposite inner sides of the trough and provided with grooved heads, inclined spring-arms arranged over the feed-belt at opposite inner sides of the trough and fitted at their upper extremities in the grooved heads of said screws, said spring-arms being provided at their upper ends with spring-coils, and a presser-roller journaled in the lower ends of said spring-arms and disposed directly over and near to the front end of the feed-belt.

In testimony that I claim the foregoing as my own I have hereto affixed my signature in the presence of two witnesses.

FERDINAND KAHLER.

Witnesses:
  JNO. W. GAITHER,
  WILLIAM F. RUOFF.